UNITED STATES PATENT OFFICE.

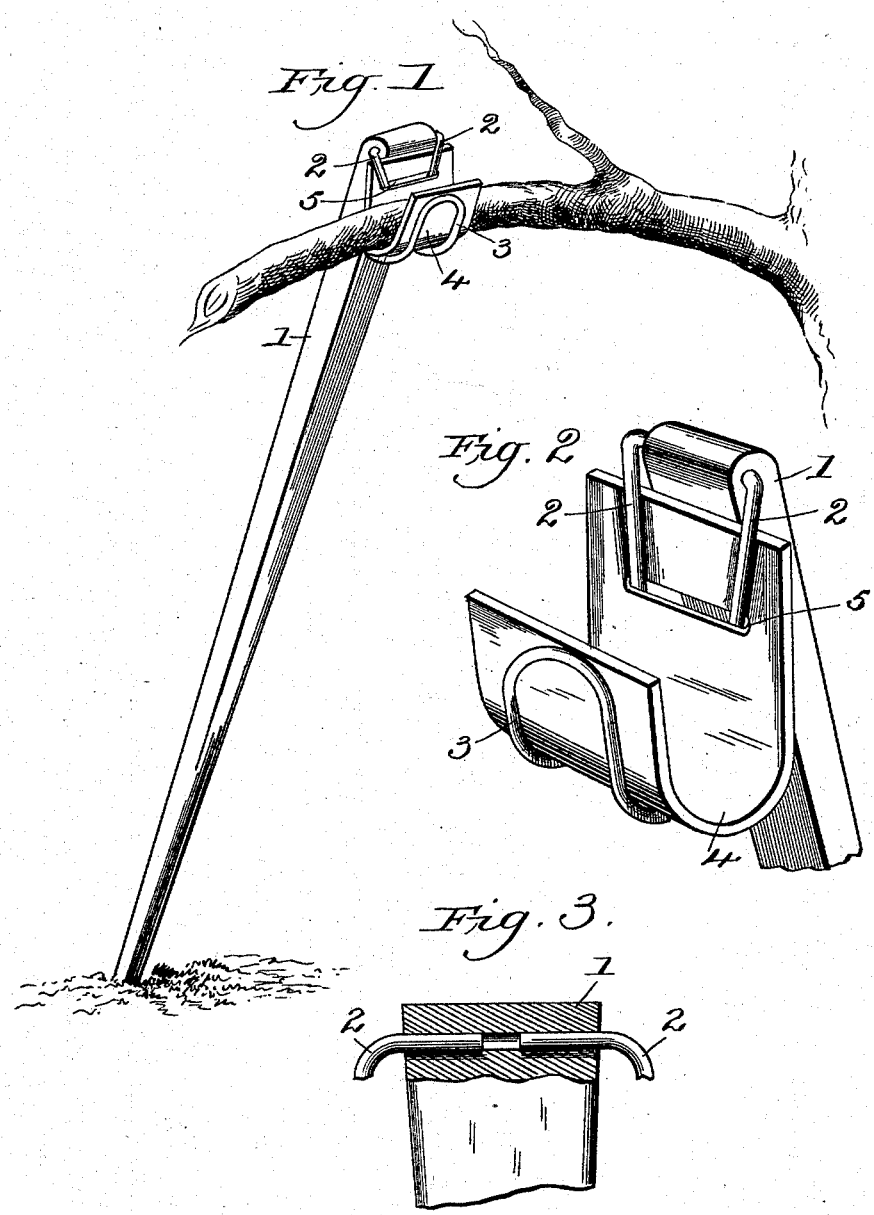

LOUIS WM. HIHN, OF SAN JOSÉ, CALIFORNIA.

FRUIT-TREE SUPPORT.

SPECIFICATION forming part of Letters Patent No. 527,492, dated October 16, 1894.

Application filed September 14, 1893. Serial No. 485,482. (No model.)

*To all whom it may concern:*

Be it known that I, LOUIS WM. HIHN, a citizen of the United States, residing at San José, in the county of Santa Clara and State of California, have invented certain new and useful Improvements in Fruit-Tree Supports or Props; and I do hereby declare the following to be a full, clear, and exact description of the invention, such as will enable others skilled in the art to which it appertains to make and use the same.

This invention relates to fruit tree supports or props, and has for its object to provide simple and effective means for protecting trees laden with fruit, or for other purposes, without injury to the same.

The invention consists in the construction and arrangement of the several parts which will be more fully hereinafter described and claimed.

In the drawings, Figure 1 is a perspective view of the prop shown in operative position. Fig. 2 is a detail perspective view of the wire attachment to the prop disconnected. Fig. 3 is a detail perspective view of the improved device as an entirety.

Similar numerals of reference are employed to indicate corresponding parts in the several views.

Referring to the drawings, the numeral 1 designates the prop proper of any suitable length, size or material. To the upper portion of the same is pivotally attached a wire frame 2, of substantial rectangular form, having its lower end constructed with an inwardly bent hook 3, and free to move inwardly toward or away from the prop 1. Over the said wire frame is slipped a felt or other fabric covering 4, having an opening or slit 5, therein which is fitted over the hook and arranged in such manner as to bring the greater bulk or quantity of said fabric over the wire forming a frame, and to protect the limb or tree against abrasion or injury.

In operation, the limb or tree is caught by the hook 3, and held against the resistance of the prop 1 to thereby support the same for any purpose which may be found desirable. The device is exceptionally simple and is easily and readily operated, and being of a simple number of parts can be quickly manufactured and cheaply sold.

Having thus described the invention, what is claimed as new is—

The combination of a prop having a wire frame pivotally attached to the upper end thereof, formed with a lower forwardly and upwardly bent hook end, and a fabric covering over the said wire frame to avoid abrasion or injury, to the tree, substantially as described.

In testimony whereof I have signed this specification in the presence of two subscribing witnesses.

LOUIS WM. HIHN.

Witnesses:
J. S. MCGINNIS,
GUY H. SALISBURY.